United States Patent [19]

Miller

[11] 3,883,821

[45] May 13, 1975

[54] SINGLE TRANSVERSE MODE OPERATION IN DOUBLE HETEROSTRUCTURE JUNCTION LASERS HAVING AN ACTIVE LAYER OF NONUNIFORM THICKNESS

[75] Inventor: Stewart Edward Miller, Locust, N.J.

[73] Assignee: Bell Telephone Laboratories, Incorporated, Murray Hill, N.J.

[22] Filed: Jan. 17, 1974

[21] Appl. No.: 434,181

[52] U.S. Cl. .................. 331/94.5 H; 357/18

[51] Int. Cl. .................. G02f 3/00

[58] Field of Search .......... 331/94.5 H; 350/96 WG; 357/18

[56] References Cited

UNITED STATES PATENTS

| | | | |
|---|---|---|---|
| 3,780,358 | 12/1973 | Thompson | 357/18 |
| 3,783,351 | 1/1974 | Tsukada | 357/18 |
| 3,790,902 | 2/1974 | Miller | 331/94.5 H |

*Primary Examiner*—Edward S. Bauer

*Attorney, Agent, or Firm*—M. J. Urbano

[57] ABSTRACT

In a double heterostructure junction laser, the active layer is provided with a rectangular step which is in registration with a stripe geometry contact. Proper choice of the step height in relation to the step width results in fundamental transverse mode operation parallel to the junction plane.

7 Claims, 4 Drawing Figures

SINGLE TRANSVERSE MODE OPERATION IN DOUBLE HETEROSTRUCTURE JUNCTION LASERS HAVING AN ACTIVE LAYER OF NONUNIFORM THICKNESS

CROSS-REFERENCE TO RELATED APPLICATIONS

This application was filed concurrently with application Ser. No. 434,286 (now U.S. Pat. No. 3,859,178, issued Jan. 7, 1975). (R. A. Logan-B. I. Miller Case 20-3) entitled "Multiple Anodization Scheme for Producing GaAs Layers of Nonuniform Thickness."

BACKGROUND OF THE INVENTION

This invention relates to junction lasers and, more particularly, to fundamental transverse mode operation in double heterostructure (DH) junction lasers.

In a double heterostructure junction laser, the output radiation pattern consists of transverse modes which oscillate both parallel and perpendicular to the plane of the p-n junction. For reasons well known in the art, it is desirable to constrain the laser to oscillate in the fundamental transverse mode only. In this regard, numerous schemes have been suggested for producing fundamental transverse mode operation perpendicular to the junction plane; e.g., U.S. Pat. No. 3,733,561, issued May 15, 1973 (I. Hayashi Case 6), application Ser. No. 203,709 (L. A. D'Asaro-J. E. Ripper Case 11-12) filed on Dec. 1,1971, now abandoned, and application Ser. No. 418,572 (B. W. Hakki-C. J. Hwang Case 11-1) filed on Nov. 23, 1973 (now U.S. Pat. No. 3,838,359, issued on Sept. 24, 1974). However, it is a well-recognized problem that wave guidance is relatively poor in the plane of the junction and hence the attainment of fundamental transverse mode operation parallel to the junction plane is relatively difficult to achieve. The most common technique for controlling modes parallel to the junction plane is to use a stripe geometry electrical contact, typically about 12 μm wide. Such contacts, however, are effective to produce the desired fundamental mode operation only at relatively low pumping current levels. As the pumping current is increased significantly above threshold, there is no guarantee that higher order modes parallel to the junction plane will be suppressed.

SUMMARY OF THE INVENTION

In accordance with an illustrative embodiment of my invention, in a double heterostructure junction laser, a semiconductor body comprises first and second wide bandgap layers, a relatively narrower bandgap third region disposed intermediate to and contiguous with said first and second layers, and a p-n junction located in said third region; characterized in that said third region includes an active region of greater thickness than the remainder of said third region, the dimensions of said active region being effective to confine radiation to substantially a single transverse mode when said p-n junction is forward biased. In particular, fundamental transverse mode operation parallel to the junction plane of a stripe geometry DH laser is achieved by a rectangular step in the active layer which is in registration with the stripe contact. The width and thickness of the rectangular step relative to one another are appropriately chosen to produce the desired fundamental mode operation parallel to the junction plane. For transverse modes perpendicular to the junction plane, any one of the numerous prior art techniques may be utilized.

BRIEF DESCRIPTION OF THE DRAWING

My invention together with its various features and advantages can be easily understood from the following more detailed description taken in conjunction with the accompanying drawing, in which.

DETAILED DESCRIPTION

Figure 1:
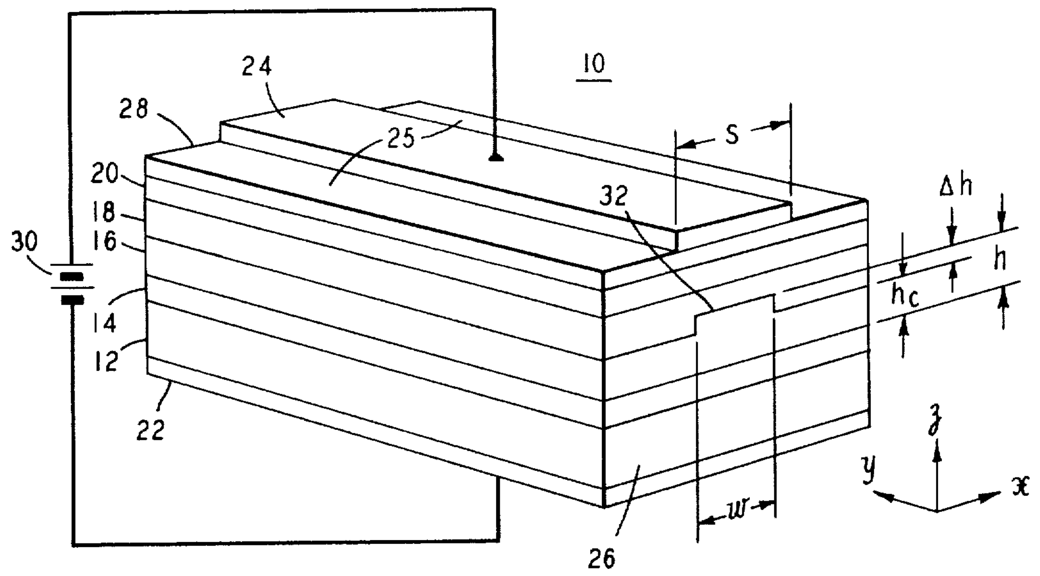
FIG. 1 is a schematic drawing of a double heterostructure junction laser in accordance with an illustrative embodiment of my invention.

Turning now to FIG. 1, there is shown a double heterostructure junction laser basically of the type described in U.S. Pat. No. 3,758,875, issued on Sept. 11, 1973 (I. Hayashi Case 4). For simplicity and to facilitate explanation, FIG. 1 is not drawn to scale. The laser 10 comprises a substrate 12 on which are grown the following layers in the order recited: a wide bandgap first layer 14, a narrower bandgap second region 16 (which may contain more than one layer), a wider bandgap third layer 18, and a contacting layer 20.

Layers 14 and 18 are generally of opposite conductivity type, whereas region 16 may be n-type, p-type, both, or compensated. The interface between layers 14 and 16 and between layers 16 and 18 form heterojunctions which act to confine radiation in the z-dimension, i.e., perpendicular to the junction plane. Region 16 contains a p-n junction (not shown) which may be located anywhere between the heterojunctions or coincident with one of them. Region 16, thus, forms the active region of the laser in which the recombination of holes and electrons produces laser radition when the p-n junction is forward biased above the lasing threshold by means of a source 30 connected between a broad area contact 22 formed on the substrate and a stripe geometry contact 24 formed on the contacting layer 20. Layer 20 is optional depending on the difficulty of forming an adherent contact directly on layer 18 (e.g., where layer 18 is AlGaAs, known metal contacts typically adhere poorly). The stripe geometry contact 24 may be formed by masking and etching an $SiO_2$ layer (not shown) in a manner well known in the art or by a proton bombardment technique applied to the lateral zones 25 on adjacent sides of contact 24, as described in copending application Ser. No. 204,222 (L. A. D'Asaro-J. C. Dyment-M. Kuhn-S. M. Spitzer Case 10-4-6-3) filed on Dec. 2, 1971 (now U.S. Pat. No. 3,824,133, issued Jul. 16, 1974).

Opposite end surfaces 26 and 28, typically cleavage faces, are formed parallel to one another thereby defining an optical cavity resonator for sustaining radiation generated in the active region. Such cleavage faces are partially transmissive so as to permit egress of a portion of the radiation from the resonator for utilization purposes.

To facilitate removal of heat from the device during either c.w. or pulsed operation, a heat sink (not shown) is typically thermally coupled to the top surface of the laser, i.e., through contact 24.

Preferably, the laser 10 is fabricated from the AlGaAs system in which, for example, the structure comprises the following layers: an n-GaAs substrate 12, an n-$Al_xGa_{1-x}As$ layer 14, a region 16 comprising a single p-GaAs layer, a p-$Al_yGa_{1-y}As$ layer 18 (typically $y = x$), and a p-GaAs layer 20. Not shown is a thing high conductivity p-GaAs layer formed on the top surface of layer 20 by the well known technique of diffusing zinc atoms therein.

Aside from the foregoing conventional elements of a double heterostructure junction laser, my invention is characterized in that the region 16 includes a central portion 32 of increased thickness, preferably in the shape of an elongated rectangular step which extends between the mirror surfaces 26 and 28 and along the resonator axis formed thereby. The central portion 32, which corresponds to the active region of my invention, has a thickness $h$ whereas the thinner lateral portions of region 16 have a thickness $h_c$. Thus, the height of the rectangular step is $\Delta h = h - h_c$. The width of the rectangular step and the width of the stripe contact are respectively $w$ and S.

Figure 2:
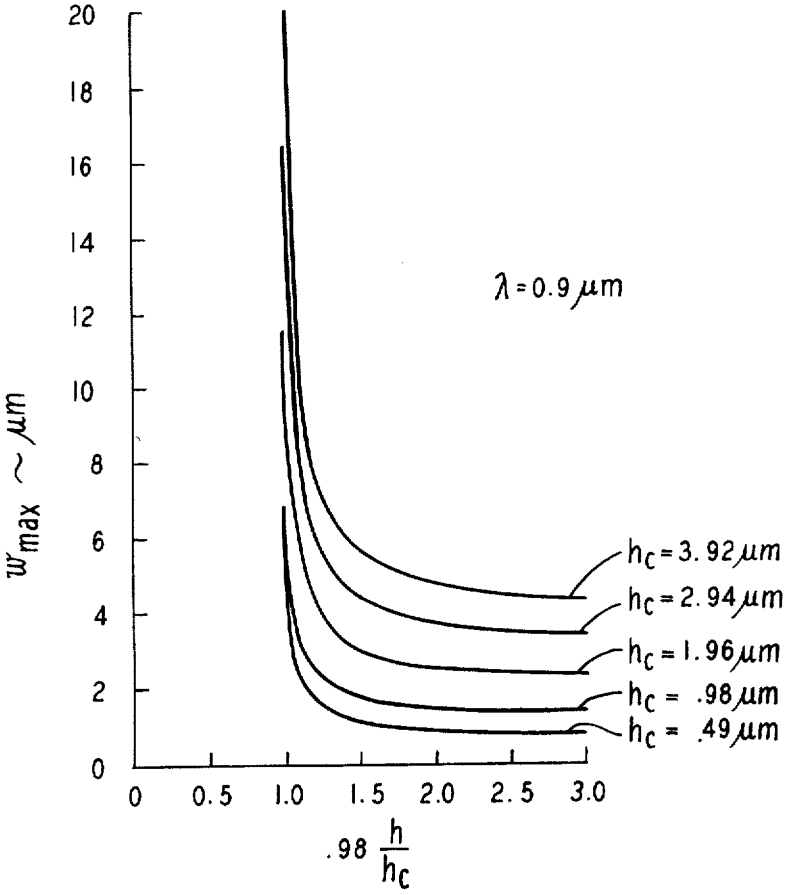
FIG. 2 is a graph of the maximum width $w_m$ of the rectangular step versus the step height $h$ for the structure of FIG. 1.

Using standard wave equations to solve the boundary valve problem associated with the structure of FIG. 1, it can be shown that for each value of $h$ and $h_c$, there is a maximum width $w_m$ of the rectangular step for which only a fundamental transverse mode parallel to the junction plane will oscillate. Thus, for example, assuming that region 16 is a single GaAs layer (hereinafter "layer 16") having an index of refraction of 3.6 and that layers 14 and 18 comprise AlGaAs having an index of refraction of 3.42, and assuming further that the free space wavelength of the laser radiation is about 0.9 $\mu$m, then a family of curves of the type shown in FIG. 2 can be calculated and plotted. FIG. 2 shows the maximum step width $w_m$ versus the ratio 0.98 $h/h_c$. In a similar fashion, the shape of the optical field within the rectangular region of the layer 16 can be characterized by its transverse wave number $\beta_{x1}$ as plotted in FIG. 3. This parameter is a measure of the degree to which the optical field of the fundamental transverse mode parallel the junction plane is confined to the rectangular step region. The corresponding transverse wave number $\beta_{x1c}$ for the field outside the rectangular step region is plotted in FIG. 4.

Figure 3:
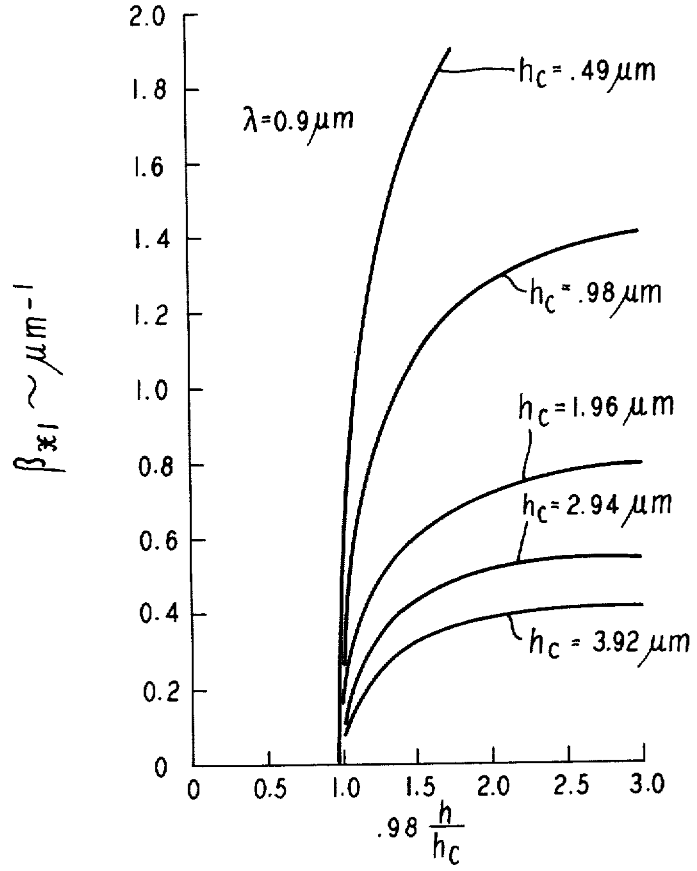
FIG. 3 is a graph of the transverse wave number $\beta_{x1}$ (of the fundamental tranverse mode parallel to the junction plane and within the central step region of width $w_m$) versus the step height $h$.
Figure 4:
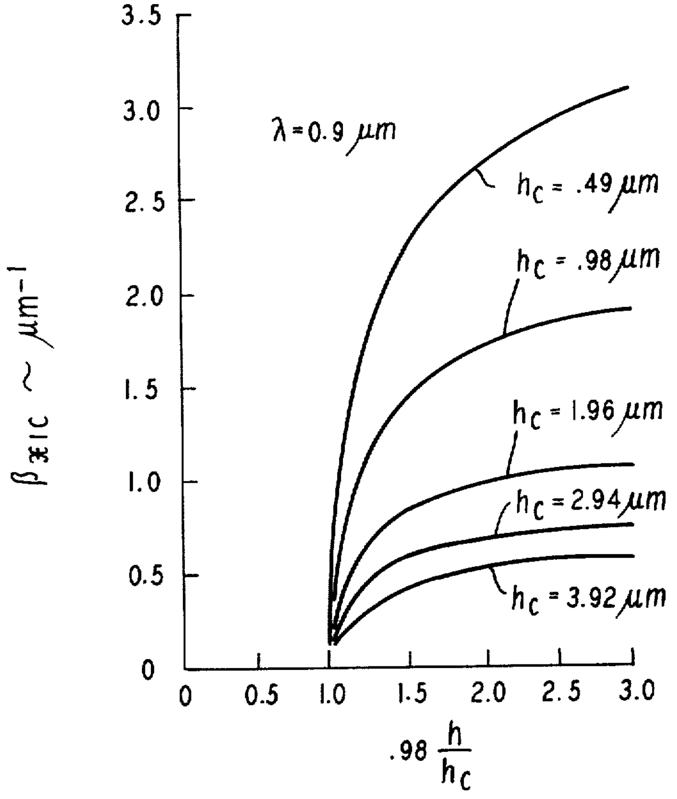
FIG. 4 is a graph of the transverse wave number $\beta_{x1c}$ (of the fundamental transverse mode parallel to the junction plane and outside the central step region of FIG. 1) versus the step height $h$.

Consider an illustrative embodiment in which the thickness of the layer 16 is $h_c$ = 0.98 $\mu$,m a suitable value for c.w. operation at room temperature. Assume further that the thickness of the layer 16 in the region of the rectangular step is $h$ = 1.1 $\mu$m so that the ratio 0.98$h/h_c$, the abscissa of FIGS. 2–4, is 1.1. Then from FIG. 2 the maximum width $w_m$ of the rectangular step is 2.95 $\mu$m for fundamental transverse mode operation parallel to the junction plane. From FIG. 2 the transverse wave number $\beta_{x1} = 0.634\ \mu m^{116\ 1}$ so that cos ($\beta_{x1}$ $w_m$12) = 0.594 which defines the shape of the field within the rectangular step. Outside of the rectangular step region, FIG. 4 gives $\beta_{x1c} = 0.86\ \mu m^{116\ 1}$ from which it can be calculated that the field external to the rectangular step region decays to 1 /$e$ of its peak value in 1.16 $\mu$m.

In a second illustrative embodiment, consider that $h_c$ = 3.92 $\mu$m and $h$ = 4.4 $\mu$m, suitable values for pulsed, high power operation. Once again the ratio 0.98 $h/h_c$ = 1.1. Then from FIGS. 2–4 it can be determined that $w_m$ = 9.36 $\mu$m, $\beta_{x1} = 0.20\ \mu m^{116\ 1}$, $\beta_{x1c} = 0.27\ \mu m^{116\ 1}$, cos ($\beta_{x1}\ w_m/2$) = 0.593 and the field external to the rectangular step region decays to $1/e$ of its peak value in 3.7 $\mu$m.

In another embodiment of my invention, $h = 0.54\ \mu$m and $h_c = 0.49\ \mu$m, typical values for c.w. operation at room temperature. Then, 0.98$h/h_c$ = 1.08, $w_m$ = 2.0 $\mu$m, $\beta_{x1} = 0.95\ \mu m^{116\ 1}$, $\beta_{x1c} = 1.26\ \mu m^{116\ 1}$, cos ($\beta_{x1} w_m/2$) = 0.566, and the field external to the rectangular step decays to $1/e$ of its peak value in 0.79 $\mu$m.

An additional feature of my invention resides in the recognition that in order to have substantially all of the optical field confined within a region in which there is electronic gain, it is desirable to utilize a stripe geometry contact having a width S which satisfies approximately the relationship $$S = w_m + \frac{2}{\beta_{x1c}}. \qquad (1)$$

In the previously described three illustrative embodiments the stripe width according to equation (1) calculates to be, respectively, $S$ = 5.3 $\mu$m, $S$ = 16.7 $\mu$m, and $S$ = 3.6 $\mu$m. These configurations in which the width of the stripe contact is wider than that of the rectangular step region 32 assure low loss, or even gain, in the regions of the layer 16 adjacent to and external from the rectangular step region 32.

An advantage of the foregoing embodiments of my invention is that each is characterized by the property of positive passive guidance independent of the pumping current level above threshold. In addition, it is expected that the structures may yield lasing thresholds at lower current densities than the prior art.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, it should be noted that one technique for fabricating the rectangular steps 32 of region 16 is the multiple anodization scheme described in the aforementioned concurrently filed application, R. A. Logan-B. I. Miller Ser. No. 434,286.

What is claimed is:

1. In a double heterostructure junction laser, a semiconductor body comprising first and second wide bandgap layers, a relatively narrower bandgap third region disposed intermediate to and contiguous with said first and second layers, and a p-n junction located in said third region; characterized in that said third region includes an active region of greater thickness than the remainder of said third region, the dimensions of said active region being effective to confine radiation to substantially a single transverse mode when said p-n junction is forward biased.

2. The body of claim 1 wherein said active region has the shape of an elongated rectangular step, the width and thickness of said step being mutually adapted to confine said radiation to a single transverse mode.

3. The body of claim 2 including further an elongated stripe geometry electrical contact in substantial registration with said active region.

4. The body of claim 3 wherein the width S of said contact satisfies approximately the relationship $$S = w_m + \frac{2}{\beta_{x1c}}$$

where $w_m$ is the maximum width of said active region for which said radiation is confined to a single transverse mode for a given thickness of said third region and of said active region, and $\beta_{x1c}$ is the transverse wave number of the fundamental transverse mode parallel to the junction plane for the optical field external to said active region.

5. The body of claim 2 wherein said body includes a pair of spaced parallel cleavage surfaces forming an optical resonator, said elongated step extending along the axis of said resonator.

6. The laser of claim 1 wherein said first layer comprises n-$Al_xGa_{1-x}As$, said second layer comprises p-$Al_zGa_{1-z}As$, and said third region and said active region comprise $Al_yGa_{1-y}As$, $0 \leq y < x$ and $z$.

7. The body of claim 6 wherein said third region and said active region comprise p-GaAs.

* * * * *